(12) United States Patent  
Paquette et al.

(10) Patent No.: US 11,180,096 B2  
(45) Date of Patent: Nov. 23, 2021

(54) ARCHITECTURE AND CONTROL SYSTEM FOR ELECTRICALLY-POWERED ACCESSORIES OF A NON-HYBRID VEHICLE

(71) Applicant: Cummins Inc., Columbus, IN (US)

(72) Inventors: Joseph E. Paquette, Columbus, IN (US); Martin T. Books, Columbus, IN (US); Mahesh Madurai Kumar, Columbus, IN (US); Jaroslaw Leonarski, Columbus, IN (US); Gary L. Parker, Columbus, IN (US); Erik L. Piper, Columbus, IN (US)

(73) Assignee: Cummins Inc., Columbus, IN (US)

( * ) Notice: Subject to any disclaimer, the term of this patent is extended or adjusted under 35 U.S.C. 154(b) by 49 days.

(21) Appl. No.: 16/490,173

(22) PCT Filed: Mar. 3, 2017

(86) PCT No.: PCT/US2017/020716  
§ 371 (c)(1),  
(2) Date: Aug. 30, 2019

(87) PCT Pub. No.: WO2018/160198  
PCT Pub. Date: Sep. 7, 2018

(65) Prior Publication Data  
US 2020/0070757 A1    Mar. 5, 2020

(51) Int. Cl.  
*B60R 16/03* (2006.01)  
*H02J 7/00* (2006.01)  
(Continued)

(52) U.S. Cl.  
CPC ......... *B60R 16/033* (2013.01); *H02K 7/1004* (2013.01); *H02K 7/116* (2013.01); *H02K 7/1815* (2013.01); *H02M 7/04* (2013.01)

(58) Field of Classification Search  
CPC .......... H02J 7/14; H02J 2310/46; H02M 7/04; H02K 7/1815; H02K 7/116; H02K 7/1004; B60R 16/03; B60R 16/033  
See application file for complete search history.

(56) References Cited

U.S. PATENT DOCUMENTS 3,456,119 A    7/1969    Schneider  
7,690,451 B2    4/2010    Chiao  
(Continued)

FOREIGN PATENT DOCUMENTS

WO    WO-2015/078481 A1    6/2015

OTHER PUBLICATIONS

Bae Systems, HybriDrive propulsion (Hybrid-electric propulsion systems), Accessory Power System-APS1, HybriDrive Propulsions Systems, retrieved from the Internet at http://www.hybridrive.com/hds_propulsion.php on Jun. 30, 2016, 4 pages.

(Continued)

*Primary Examiner* — Adi Amrany  
*Assistant Examiner* — Esayas G Yeshaw  
(74) *Attorney, Agent, or Firm* — Foley & Lardner LLP (57) ABSTRACT

A system for a non-hybrid/non-electric vehicle includes a high voltage electromagnetic device and a power electronics system. The high voltage electromagnetic device is structured to couple to an engine and generate AC electrical power from the engine. The power electronics system is electrically coupled to the high voltage electromagnetic device. The power electronics system includes an AC-to-DC inverter and a junction box. The AC-to-DC inverter is structured to receive and change the AC electrical power to regulated DC electrical power. The junction box is structured to receive and provide the regulated DC electrical power to a plurality of electrical paths that electrically couple the junction box to a plurality of electrically-powered (Continued)

accessories. The regulated DC electrical power is provided to each of the plurality of electrically-powered accessories based on an electric power consumption need of each respective electrically-powered accessory.

19 Claims, 4 Drawing Sheets

(51) Int. Cl.
*B60R 16/033* (2006.01)
*H02K 7/10* (2006.01)
*H02K 7/116* (2006.01)
*H02K 7/18* (2006.01)
*H02M 7/04* (2006.01)

(56) References Cited

U.S. PATENT DOCUMENTS

| | | |
|---|---|---|
| 7,748,482 B2 | 7/2010 | Holmes et al. |
| 7,905,813 B2 | 3/2011 | Edelson et al. |
| 7,911,079 B2 | 3/2011 | Hoff et al. |
| 8,245,801 B2 | 8/2012 | Flett |
| 9,114,723 B2 | 8/2015 | Bissontz |
| 2005/0127856 A1 | 6/2005 | Maslov |
| 2012/0056474 A1 | 3/2012 | Larson et al. |
| 2012/0245772 A1* | 9/2012 | King .................. B60W 10/08 701/22 |
| 2013/0140883 A1* | 6/2013 | Tawada ............ H02J 13/00016 307/9.1 |
| 2015/0120129 A1* | 4/2015 | Lee .................... B60L 58/40 701/29.1 |
| 2015/0202978 A1* | 7/2015 | Hatanaka ............... B60L 7/26 701/19 |
| 2016/0254665 A1* | 9/2016 | Hur ..................... H02J 3/381 307/24 |
| 2016/0301295 A1* | 10/2016 | Regier .................. H02J 3/383 |
| 2017/0058755 A1* | 3/2017 | Madurai-Kumar ..... F01P 7/164 |
| 2017/0355269 A1* | 12/2017 | An ...................... B60L 50/51 |

OTHER PUBLICATIONS

Bae Systems, HybriDrive propulsion (Hybrid-electric propulsion systems), APS2, HybriDrive Propulsions Systems, retrieved from the Internet at http://www.hybridrive.com/hds_propulsion.php on Jun. 30, 2016, 4 pages.

Bae Systems, HybriDrive propulsion (Hybrid-electric propulsion systems), APS3, HybriDrive Propulsions Systems, retrieved from the Internet at http://www.hybridrive.com/hds_propulsion.php on Jun. 30, 2016, 4 pages.

International Search Report and Written Opinion for International Application No. PCT/US2017/020716, dated Jun. 27, 2017, 11 pages.

* cited by examiner

ARCHITECTURE AND CONTROL SYSTEM FOR ELECTRICALLY-POWERED ACCESSORIES OF A NON-HYBRID VEHICLE

TECHNICAL FIELD

The present application relates generally to the field of electrically-powered vehicle accessories. More particularly, the present application relates to systems and methods for independently controlling electrically-powered vehicle accessories of non-hybrid/non-electric vehicles.

BACKGROUND

With the advent of new automotive technologies such as hybrid and electric vehicles, a natural and common outcome is the electrification of engine and vehicle accessories that have traditionally been belt driven off of the engine. These accessories may include air compressors (for pneumatic devices), air conditioning, power steering pumps, engine coolant pumps, fans, etc. However, conventional vehicles (i.e., non-hybrid, non-electric vehicles) typically are incapable of powering such accessories that have traditionally been engine driven, but are now being electrified.

SUMMARY

One embodiment relates to a system for a non-hybrid/non-electric vehicle. The system includes a high voltage electromagnetic device and a power electronics system. The high voltage electromagnetic device is structured to couple to an engine and generate AC electrical power from the engine. The power electronics system is electrically coupled to the high voltage electromagnetic device. The power electronics system includes an AC-to-DC inverter and a junction box. The AC-to-DC inverter is structured to receive and change the AC electrical power to regulated DC electrical power. The junction box is structured to receive and provide the regulated DC electrical power to a plurality of electrical paths that electrically couple the junction box to a plurality of electrically-powered accessories. The regulated DC electrical power is provided to each of the plurality of electrically-powered accessories based on an electric power consumption need of each respective electrically-powered accessory.

Another embodiment relates to a method. The method includes providing a motor-generator, providing a power electronics system, and providing a controller. The motor-generator is structured to (i) couple to a non-hybrid engine system having an engine and (ii) generate electrical power from a mechanical input received from the engine. The power electronics system is structured to (i) electrically couple the motor-generator to a plurality of electrically-powered accessories and (ii) regulate the electrical power to accessory specific output power for each of the plurality of electrically-powered accessories. The controller is structured to control each of the plurality of electrically-powered accessories independently and independent of a speed of the engine.

Another embodiment relates to a vehicle. The vehicle includes a motor-generator and a power electronics system. The motor-generator is structured to (i) couple to an engine and (ii) generate high voltage AC electrical power from a mechanical input received from the engine. The power electronics system is electrically coupled to the motor-generator and a plurality of electrically-powered accessories. The power electronics system is structured to regulate the high voltage AC electrical power to accessory specific output power for each of the plurality of electrically-powered accessories. The accessory specific output power includes at least one of high voltage DC electrical power, variable AC electrical power, and low voltage DC electrical power.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for independently controlling electrically-powered accessories of non-hybrid/non-electric vehicles. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods that facilitate independently controlling electrically-powered accessories of non-hybrid/non-electric vehicles. According to an example embodiment, a conventional, non-hybrid, non-electric vehicle includes (i) a powertrain having an engine and an electromagnetic device (e.g., a high voltage alternator, a motor-generator, etc.), (ii) a power electronics system, (iii) an electrified accessories system including a plurality of electrically-powered accessories, and (iv) a controller. The electromagnetic device may be structured to be mechanically driven by the engine to generate a high voltage power output (e.g., a high voltage alternating current ("AC") electrical power output, etc.). According to an example embodiment, the electromagnetic device does not provide any electrical power to drive the vehicle unlike hybrid and electric vehicles. The power electronics system is structured to regulate and provide accessory specific power to each of the plurality of electrically-powered accessories (e.g., high voltage direct current ("DC") power to high voltage DC accessories, low voltage DC power to low voltage DC accessories, variable AC power to AC accessories, etc.) based on an electric power consumption need thereof. Therefore, all of the plurality of electrically-powered accessories may be powered by a single engine-driven power source (i.e., the electromagnetic device). According to an example embodiment, the electromagnetic device and the power electronics system are structured such that the controller may control each of the plurality of electrically-powered accessories independently and independent of the speed of the engine (i.e., since the accessories are not mechanically driven by the engine)

without the conventional, non-hybrid, non-electrical vehicle including a high voltage energy storage device. Thus, the vehicle does not include a high capacity battery system typically used in hybrid or electric vehicles. Rather, the vehicle only includes a low voltage energy storage device such as a lead acid battery.

With hybrid and electric vehicles becoming more mainstream, engine and vehicle accessories that have traditionally been driven by an engine are becoming electrified. These accessories include, but are not limited to, air compressors (for pneumatic devices), air conditioning, power steering pumps, engine coolant pumps, fans, etc. Hybrid and electric vehicles typically include high voltage energy storage (e.g., lithium-ion battery systems, etc.) that has the capability to power these electrified accessories. However, conventional vehicles (i.e., non-hybrid, non-electric vehicles) typically include a low voltage alternator and low voltage energy storage (i.e., lead-acid batteries) that are incapable of or not practical for powering such electrified accessories. According to the present disclosure, a conventional vehicle includes a more robust, more powerful, and higher voltage electromagnetic device (e.g., motor-generator, alternator, etc.) that is implemented with a sophisticated architecture and capable of generating high voltage electrical power to power numerous electrified accessories without the use of high voltage energy storage. Beneficially, the architecture of the present disclosure may not only enable relatively more efficient operation of electrified accessories, but may also enable the implementation of electrified accessories within a conventional, non-hybrid, and non-electric vehicle.

Figure 1:
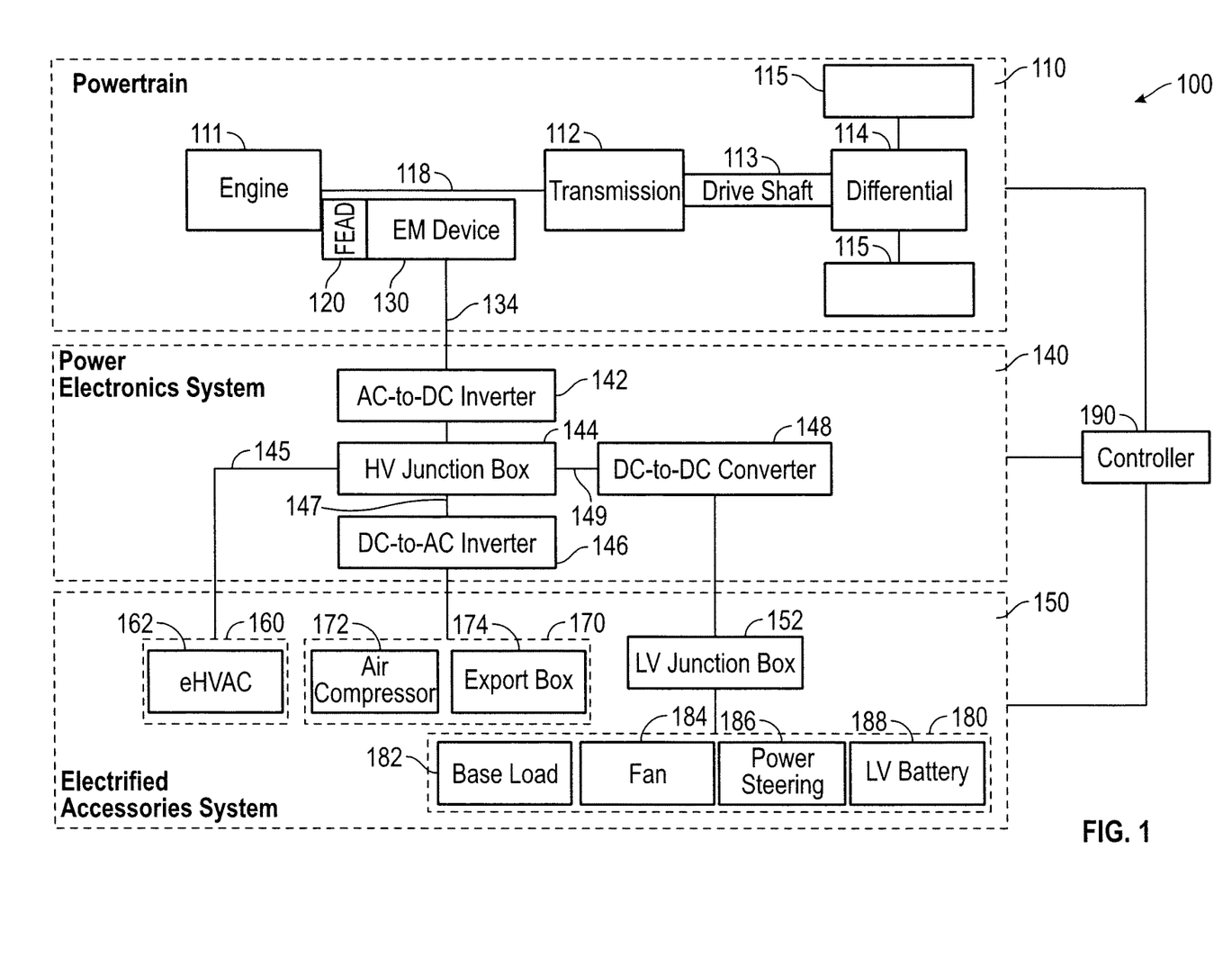
FIG. 1 is a schematic diagram of a vehicle with a controller, according to an example embodiment.

Referring now to FIG. 1, a schematic diagram of a vehicle 100 is shown according to an example embodiment. As shown in FIG. 1, the vehicle 100 generally includes a powertrain system 110, a power electronics system 140, an electrified accessories system 150, and a controller 190. These components are described more fully herein. The vehicle 100 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, delivery trucks, and any other type of vehicle. In some implementations, the vehicle 100 may be other types of engine-driven equipment such as mining equipment, a power generator, and marine equipment.

According to an example embodiment, the powertrain system 110 of the vehicle 100 is structured as a conventional, non-hybrid, non-electric powertrain system. As such, the powertrain system 110 and the vehicle 100 do not include a high capacity (e.g., high voltage, high power, etc.) energy storage device (i.e., the vehicle 100 does not include batteries typically used in hybrid and/or electric vehicles). In other embodiments, the powertrain system 110 of the vehicle 100 is structured as another type of powertrain system. As used herein, "high voltage" may refer to a voltage that is greater than 28 volts (e.g., volts DC, 60 volts, 100 volts, 500 volts, 700 volts, 1,000 volts, etc.), while "low voltage" may refer to a voltage that is less than or equal to 28 volts (e.g., 5 volts, 12 volts, 24 volts, etc.).

Components of the vehicle 100 may communicate with each other using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 190 is communicably coupled to the systems and components in the vehicle 100 of FIG. 1, the controller 190 may be structured to receive values, information, communication signals, and/or otherwise data regarding one or more of the components shown in FIG. 1. For example, the data may include operation data regarding the operating conditions of powertrain system 110, the power electronics system 140, and/or the electrified accessories system 150. The controller 190 may determine how to control powertrain system 110, the power electronics system 140, and/or the electrified accessories system 150 based on the operation data.

As shown in FIG. 1, the powertrain system 110 includes an engine 111, a transmission 112, a drive shaft 113, a differential 114, a final drive 115, a front end accessory drive ("FEAD") 120 (e.g., a drive mechanism, a coupling mechanism, etc.), and an electromagnetic device 130 (e.g., a motor-generator, a generator, a high voltage alternator, etc.). The engine 111 may be structured as any engine type usable in a non-hybrid or non-electric vehicle, including a spark-ignition internal combustion engine and/or a compression-ignition internal combustion engine. The engine 111 may be powered by any fuel type (e.g., diesel, ethanol, gasoline, natural gas, propane, etc.). Similarly, the transmission 112 may be structured as any type of transmission, such as a continuous variable transmission, a manual transmission, an automatic transmission, an automatic-manual transmission, a dual clutch transmission, and so on.

Accordingly, as transmissions vary from geared to continuous configurations (e.g., continuous variable transmission), the transmission 112 may include a variety of settings (gears, for a geared transmission) that affect different output speeds based on an input speed received thereby (e.g., from the engine 111, etc.). Like the engine 111 and the transmission 112, the drive shaft 113, differential 114, and final drive 115 may be structured in any configuration dependent on the application (e.g., the final drive 115 is structured as wheels in an automotive application and a propeller in a boat application, etc.). Further, the drive shaft 113 may be structured as any type of drive shaft including, but not limited to, a one-piece, two-piece, and a slip-in-tube driveshaft based on the application.

Figure 2:
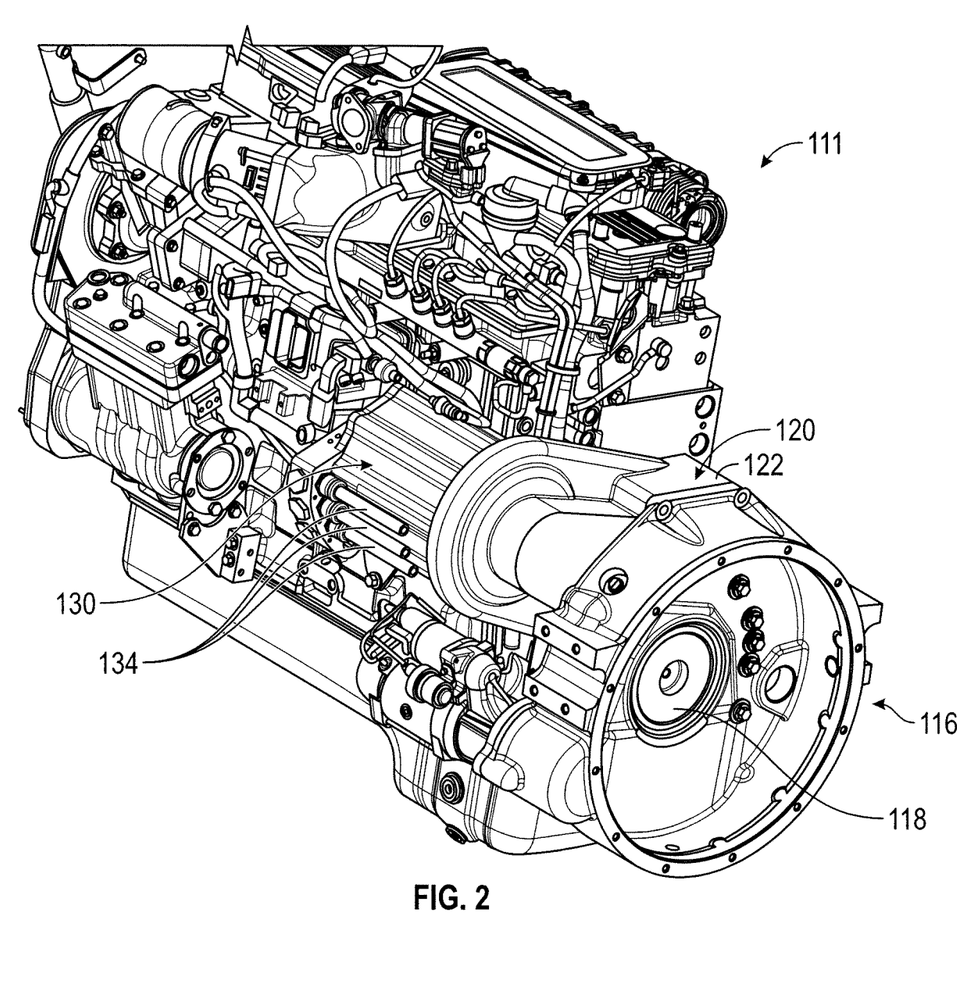
FIG. 2 is a front perspective view of an engine system of the vehicle of FIG. 1, according to an example embodiment.
Figure 3:
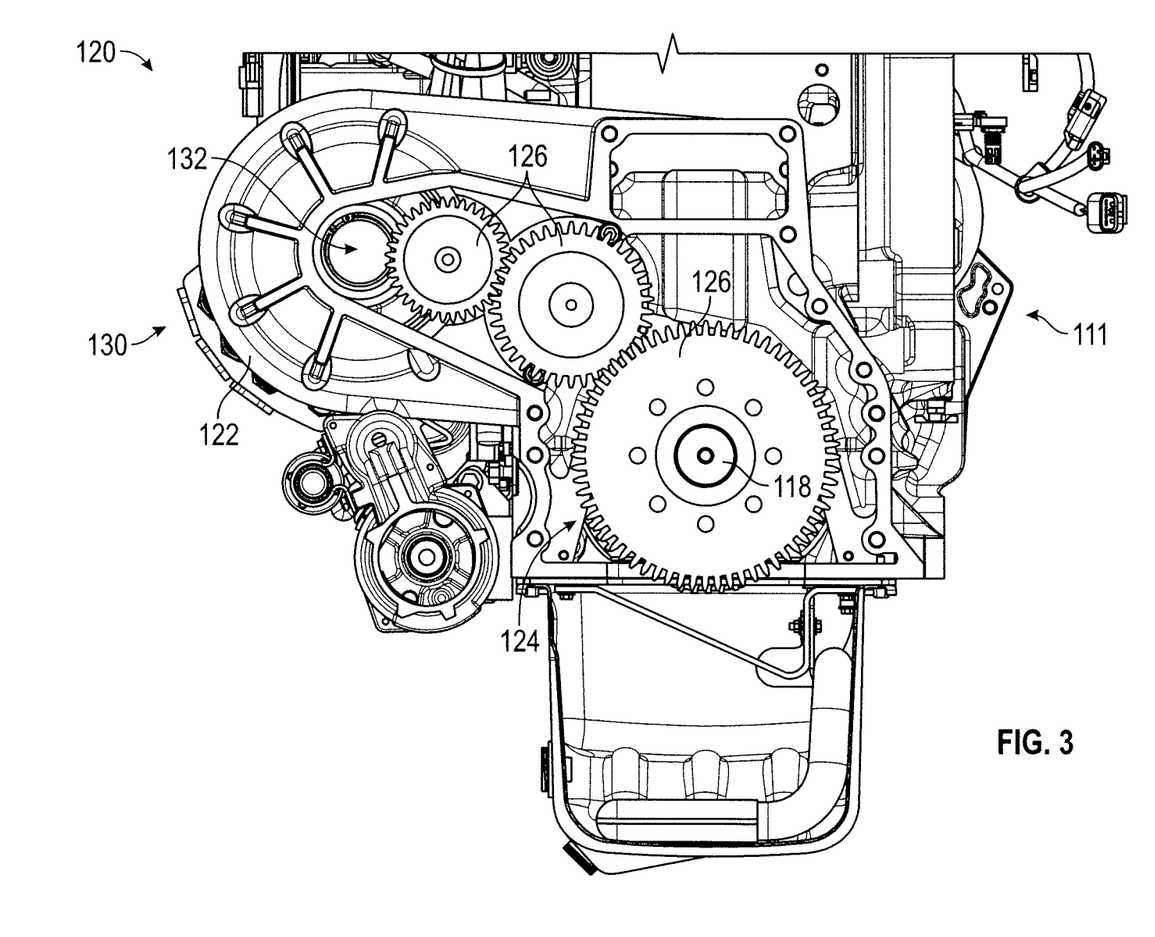
FIG. 3 is a cross-sectional view of the engine system of FIG. 2, according to an example embodiment.

As shown in FIGS. 2 and 3, the engine 111 includes a front end 116 that has an engine output 118. As shown in FIG. 1, the engine output 118 is structured to facilitate coupling the engine 111 to the transmission 112 such that the engine 111 may drive the vehicle 100. As shown in FIGS. 2 and 3, the FEAD 120 includes a housing 122 coupled to the front end 116 of the engine 111. As shown in FIGS. 1-3, the FEAD 120 is structured to mechanically couple the electromagnetic device 130 to the front end 116 of the engine 111. As shown in FIG. 3, the housing 122 defines an interior cavity that contains a coupling system 124. According to the example embodiment shown in FIG. 3, the coupling system 124 is structured as a gearing system or geartrain having a plurality of gears 126 that mechanically couple the engine output 118 of the engine 111 to an electromagnetic device input 132 of the electromagnetic device 130. In other embodiments, the coupling system 124 is structured as a pulley system and/or belt drive system that mechanically couples the engine output 118 of the engine 111 to the electromagnetic device input 132 of the electromagnetic device 130. In still other embodiments, the coupling system 124 is otherwise structured to mechanically couple the engine output 118 of the engine 111 to the electromagnetic device input 132 of the electromagnetic device 130 (e.g., a combination of gears and pulleys, a shaft-coupling, belt(s), etc.). According to an example embodiment, the coupling system 124 of the FEAD 120 is structured to transfer a mechanical output from the engine output 118 of the engine 111 into a mechanical input (e.g., a torque input, a speed input, etc.) received by the electromagnetic device input 132 of the electromagnetic device 130 to facilitate operation thereof. The coupling system 124 may provide a multiplier (e.g., 1.5, 2.7, 3, etc.; based on a gearing ratio, a pulley ratio, etc. of the coupling system 124) that facilitates operating the electromagnetic device 130 at a higher or lower speed than the engine 111. In sill other embodiments, the electromagnetic device input 132 of the electromagnetic device 130 is directly coupled to the engine output 118 of the engine 111.

The electromagnetic device 130 is structured to generate high voltage AC electrical power from the mechanical input received from the engine 111. According to an example embodiment, the electromagnetic device 130 is a larger, more robust, and higher output alternator than what is traditionally included with conventional, non-hybrid, non-electric vehicles. By way of example, traditional vehicle alternators may operate with less than a 50 Newton-meter input from an engine and generate less than 1 to 2 kilowatts of electrical power having a voltage between 12 to 15 volts AC (i.e., low voltage). Additionally, the electromagnetic device 130 does not provide any electrical power to drive the vehicle 100 (e.g., unlike in hybrid vehicles and electric vehicle, etc.).

According to an example embodiment, the electromagnetic device 130 is structured to operate off of a peak torque input (e.g., received at the electromagnetic device input 132, etc.) between 150 Newton-meters and 250 Newton-meters (e.g., 206 Newton-meters, etc.). According to an example embodiment, the electromagnetic device 130 is structured to operate at an idle speed that requires a continuous torque input of at least 100 Newton-meters (e.g., 129 Newton-meters, at the electromagnetic device input 132, etc.). In other embodiments, the electromagnetic device 130 is structured to operate at an idle speed that requires a different continuous torque input that is less than 100 Newton-meters (e.g., 75 Newton-meters, etc.). The engine torque provided at the engine output 118 may be greater than the torque input at the electromagnetic device input 132 (e.g., based on the multiplier amount of the coupling system 124, etc.).

According to an example embodiment, the electromagnetic device 130 is capable of generating the high voltage AC electrical power at a power output between 10 kilowatts and 50 kilowatts. In one embodiment, the electromagnetic device 130 is structured to facilitate generating a power output between 18 kilowatts (e.g., at an idle speed, 2160 RPM, etc.) and 32 kilowatts (e.g., at a maximum speed, 6480 RPM, etc.). In another embodiment, the electromagnetic device 130 is structured to facilitate generating a power output between 25 kilowatts (e.g., at idle speed, 2160 RPM, etc.) and 40 kilowatts (e.g., at a maximum speed, 6480 RPM, etc.). In still other embodiments, the electromagnetic device 130 is structured to facilitate generating a power output greater than 50 kilowatts (e.g., 60 kilowatts, 90 kilowatts, 100 kilowatts, etc.) or less than 10 kilowatts (e.g., 8 kilowatts, 5 kilowatts, etc.). According to an example embodiment, the electromagnetic device 130 is structured to generate the high voltage AC electrical power at a voltage between 24 and 1,000 volts AC. In one embodiment, the voltage is 700 volts AC. In another embodiment, the voltage is greater than or less than 700 volts AC (e.g., 800 volts AC, 500 volts AC, 230 volts AC, etc.). The electromagnetic device 130 may thereby require a much large mechanical input from the engine 111 and generate significantly more power than alternators of conventional, non-hybrid, non-electric vehicles.

In a conventional, non-hybrid, non-electric powertrain system such as the powertrain system 110, the engine 111 receives a chemical energy input (e.g., a fuel such as gasoline, diesel, etc.) and combusts the fuel to generate mechanical energy, in the form of a rotating crankshaft (e.g., the engine output 118, etc.). The transmission 112 receives the rotating crankshaft and manipulates the speed of the crankshaft (e.g., the engine revolutions-per-minute (RPM), etc.) to affect a desired drive shaft speed. The rotating drive shaft 113 is received by the differential 114, which provides the rotation energy of the drive shaft 113 to the final drive 115. The final drive 115 then propels or moves the vehicle 100. Additionally, the FEAD 120 and/or the electromagnetic device 130 receives the mechanical energy of the rotating crankshaft (e.g., via the engine output 118, the coupling system 124, and the electromagnetic device input 132) to drive the electromagnetic device 130 and generate the high voltage AC electrical power therewith.

As shown in FIGS. 1 and 2, the electromagnetic device 130 includes an electrical output 134. As shown in FIG. 1, the electrical output 134 is structured to electrically couple the electromagnetic device 130 to the power electronics system 140 and the electrified accessories system 150. The electromagnetic device 130 may thereby be structured to provide the generated high voltage AC electrical power to the power electronics system 140. According to an example embodiment, the power electronics system 140 is structured to regulate the high voltage AC electrical power to at least one of high voltage DC electrical power, variable AC electrical power, and low voltage DC electrical power for each of the plurality of electrically-powered accessories of the vehicle 100 based on an electric power consumption need of each respective electrically-powered accessory. It should be noted that the power electronics system 140, the electrified accessories system 150, and the components of each (e.g., inverters, converters, junction box, electrically powered accessories, air compressor, fan, battery, power steering, etc.) have been purposefully left out of FIGS. 2 and 3 for clarity.

As shown in FIG. 1, the power electronics system 140 is structured to electrically couple the electromagnetic device 130 to the electrified accessories system 150. As shown in FIG. 1, the electrified accessories system 150 includes a low voltage junction box 152, one or more first electrically-powered accessories 160, one or more second electrically-powered accessories 170, and one or more third electrically-powered accessories 180. According to an example embodiment, the power electronics system 140 is structured to regulate the high voltage AC electrical power received from the electromagnetic device 130 to accessory specific output power based on each of the first electrically-powered accessories 160, the second electrically-powered accessories 170, and the third electrically-powered accessories 180 (e.g., based on the electric power consumption need of each respective electrically-powered accessory, etc.).

As shown in FIG. 1, the power electronics system 140 includes an AC-to-DC inverter 142 (e.g., a main inverter, etc.), a high voltage junction box 144, a DC-to-AC inverter 146, and a DC-to-DC converter 148. As shown in FIG. 1, the AC-to-DC inverter 142 is structured to receive the high voltage AC electrical power from the electrical output 134 of the electromagnetic device 130. According to an example embodiment, the AC-to-DC inverter 142 is structured to change and regulate the high voltage AC electrical power (e.g., at 500, 700, 800, etc. volts AC) to high voltage DC electrical power (e.g., at 500, 700, 800, etc. volts DC). By way of example, the AC-to-DC inverter 142 is structured to operate purely from a voltage regulation mode such that the instantaneous electrical demand is met at all times (e.g., maintains the DC bus voltage at a required level, etc.).

As shown in FIG. 1, the high voltage junction box 144 is electrically coupled to the AC-to-DC inverter 142 and structured to receive the high voltage DC electrical power therefrom. In some embodiments, the high voltage junction box 144 includes various fuses, breakers, etc. for different electrified-accessory loads connected to the high voltage junction box 144. As shown in FIG. 1, the high voltage junction box 144 is structured to function as a distribution point that provides the high voltage DC electrical power to at least one of a first electrical path 145, a second electrical path 147, and a third electrical path 149. In some embodiments, the high voltage junction box 144 is structured to provide the high voltage DC electrical to more than or less than three electrical paths (e.g., one, two, four, five, etc.). By way of example, the architecture of the connection between the high voltage junction box 144 and the accessories of the electrified accessories system 150 may be application specific and/or depend on vehicle type (e.g., a transit bus may have a different architecture and accessories than a passenger car, etc.).

As shown in FIG. 1, the first electrical path 145 electrically couples the high voltage junction box 144 to the first electrically-powered accessories 160 and is structured to facilitate providing the high voltage DC electrical power directly to the first electrically-powered accessories 160. According to an example embodiment, the first electrically-powered accessories 160 include accessories that require high voltage DC electrical power to facilitate operation thereof. As shown in FIG. 1, the first electrically-powered accessories 160 include an electrified heating, ventilation, and air conditioning ("eHVAC") unit 162. The eHVAC unit 162 may include various inverters and/or DC/AC motor drives that are structured to operate refrigerant compressors, blowers, and/or fans of the eHVAC unit 162. The DC/AC motor drives of the eHVAC unit 162 may be structured to create three-phase variable AC voltage and frequency for the different fan, blower, and/or compressor loads with voltage and/or frequency levels changing based on a cooling load required from the eHVAC unit 162. In some embodiments, the first electrically-powered accessories 160 additionally or alternatively include other electrically-powered accessories that utilize high voltage DC electrical power. By way of example, the first electrically-powered accessories 160 may include an electrified power steering system, an electrified fan system, and/or other electrically-powered accessories that may be powered by high voltage DC electrical power.

As shown in FIG. 1, the second electrical path 147 includes the DC-to-AC inverter 146 electrically coupled to the high voltage junction box 144 and structured to receive the high voltage DC electrical power therefrom. According to an example embodiment, the DC-to-AC inverter 146 is structured to change the high voltage DC electrical power to variable AC electrical power. By way of example, the variable AC electrical power may include three-phase variable AC voltage and/or frequency. As shown in FIG. 1, the DC-to-AC inverter 146 is electrically coupled to the second electrically-powered accessories 170 and is structured to provide the variable AC electrical power to the second electrically-powered accessories 170. In some embodiments, the DC-to-AC inverter 146 includes a plurality of DC-to-AC inverters structured to facilitate providing differing amounts of variable AC electrical power to one or more of the second electrically-powered accessories 170. In some embodiments, the DC-to-AC inverter 146 is selectively controllable and/or calibratable to facilitate providing differing amounts of variable AC electrical power to the second electrically-powered accessories 170 (e.g., by the controller 190, etc.). According to an example embodiment, the second electrically-powered accessories 170 include accessories that require variable AC electrical power to facilitate operation thereof.

As shown in FIG. 1, the second electrically-powered accessories 170 include an electrified air compressor 172 and an export box 174. The electrified air compressor 172 may include a scroll type, a piston type, and/or another type of air compressor. The electrified air compressor 172 may be driven by a three-phase induction electric motor or a three-phase permanent magnet electric motor. According to an example embodiment, the DC-to-AC inverter 146 is structured to facilitate driving the electrified air compressor 172 at any speed within an operating range thereof at any time based on vehicle conditions. The export box 174 may include power outlets structured to facilitate providing variable AC electrical power to devices and/or systems external to the vehicle 100. By way of example, the export box 174 may include one or more first electrical power outlets structured to provide electrical power at a voltage of 120 volts AC with a frequency of 60 Hertz ("Hz"), one or more second electrical power outlets structured to provide electrical power at a voltage of 230 volts AC with a frequency of 50 Hz, one or more third electrical power outlets structured to provide electrical power at a voltage of 240 volts AC with a frequency of 60 Hz, and/or any other type of electrical power outlets commonly used (e.g., to facilitate providing one-phase, three-phase, etc. electrical power to external devices). According an example embodiment, the vehicle 100 having the export box 174 may thereby be used as a remote power source (e.g., a micro-grid, etc.). Such a remote power source may be useful in emergencies (e.g., after a hurricane, during a power outage/black-out, etc.), in remote locations, and/or in other situations. In some embodiments, the second electrically-powered accessories 170 additionally or alternatively include other electrically-powered accessories that may be powered by variable AC electrical power.

As shown in FIG. 1, the third electrical path 149 includes the DC-to-DC converter 148 electrically coupled to the high voltage junction box 144 and structured to receive the high voltage DC electrical power therefrom. According to an example embodiment, the DC-to-DC converter 148 is structured to step (e.g., reduce, buck, etc.) the high voltage DC electrical power to low voltage DC electrical power. By way of example, the low voltage DC electrical power may be provided at a voltage ranging anywhere from 1 volt DC to 28 volts DC. As shown in FIG. 1, the DC-to-DC converter 148 is electrically coupled to the low voltage junction box 152 and is structured to provide the low voltage DC electrical power to the low voltage junction box 152. In some embodiments, the DC-to-DC converter 148 includes a plurality of DC-to-DC converters structured to facilitate providing differing amounts of low voltage DC electrical power (e.g., at a voltage of 1 volt DC, 5 volts DC, 12 volts DC, 24 volts DC, etc.) to the low voltage junction box 152. In some embodiments, the DC-to-DC converter 148 is selectively controllable and/or calibratable to facilitate providing differing amounts of low voltage DC electrical power (e.g., at a voltage of 12 volts DC, 24 volts DC, etc.) to the low voltage junction box 152 (e.g., by the controller 190, etc.). According to an example embodiment, the DC-to-DC converter 148 functions as a replacement for a low voltage alternator that is typically mounted to an engine of a conventional, non-hybrid vehicle to power low voltage accessories electrically coupled thereto.

As shown in FIG. 1, the third electrical path 149 includes the low voltage junction box 152 electrically coupled to the DC-to-DC converter 148 and structured to receive the low voltage DC electrical power therefrom. In some embodiments, the low voltage junction box 152 includes various fuses, breakers, etc. for different electrified-accessory loads connected to the low voltage junction box 152. As shown in FIG. 1, the low voltage junction box 152 is structured to function as a distribution point that provides the low voltage DC electrical power to at least one of the third electrically-powered accessories 180. According to an example embodiment, the third electrically-powered accessories 180 include accessories that require low voltage DC electrical power to facilitate operation thereof.

As shown in FIG. 1, the third electrically-powered accessories 180 include a base load 182, an electrified fan 184, an electrified power steering system 186, and a low voltage battery system 188. The base load 182 may include low voltage devices such as interior lights, exterior lights, windshield wipers, radio, control modules, control circuitry, power outlets (e.g., 5 Volt DC outlets, 12 Volt DC outlets, 24 Volt DC outlet, etc.), fans, blowers, and/or other accessories that require low voltage DC electrical power to facilitate operation thereof. The electrified fan 184 may be structured to facilitate providing cooling to a radiator and/or a charge air cooler of the engine 111. In other embodiments, the electrified fan 184 is included in the first electrically-powered accessories 160 and structured to receive high voltage DC electrical power. Thus, there may be more than one electrified fan included with the vehicle 100. The electrified power steering system 186 may be structured to replace a conventional engine driven power steering system having an engine driven hydraulic pump. By way of example, the electrified power steering system 186 may include an electric motor that powers a hydraulic pump thereof. According to an example embodiment, the hydraulic pump of the electrified power steering system 186 is capable of being selectively controlled (e.g., by the controller 190, etc.) based on vehicle operating conditions rather than being passively controlled based solely on engine speed (e.g., when an engine driven hydraulic pump, etc.). In other embodiments, the electrified power steering system 186 is included in the first electrically-powered accessories 160 and structured to receive high voltage DC electrical power. The low voltage battery system 188 may include one or more lead-acid batteries structured to selectively receive and store low voltage DC electrical power. In some embodiments, the DC-to-DC converter 148 is structured to facilitate selectively controlling a charge rate of the low voltage battery system 188 by providing the ability to selectively adjust the voltage level of the low voltage DC electrical power (e.g., which may be necessary after an engine crank event, etc.). The low voltage battery system 188 may be structured to facilitate providing low voltage DC electrical power (e.g., for a short period of time, etc.) to one or more of the third electrically-powered accessories 180 (e.g., in response to the engine 111, the electromagnetic device 130, the power electronics system 140, etc. failing and/or going offline). In some embodiments, the third electrically-powered accessories 180 additionally or alternatively include other electrically-powered accessories that may be powered by low voltage DC electrical power.

As the components of FIG. 1 are shown to be embodied in the vehicle 100, the controller 190 may be structured as one or more electronic control units (ECU). As such, the controller 190 may be separate from or included with at least one of a transmission control unit, an exhaust aftertreatment control unit, a powertrain control module, an engine control module, etc. The function and structure of the controller 190 is described in greater detail in FIG. 4.

Figure 4:
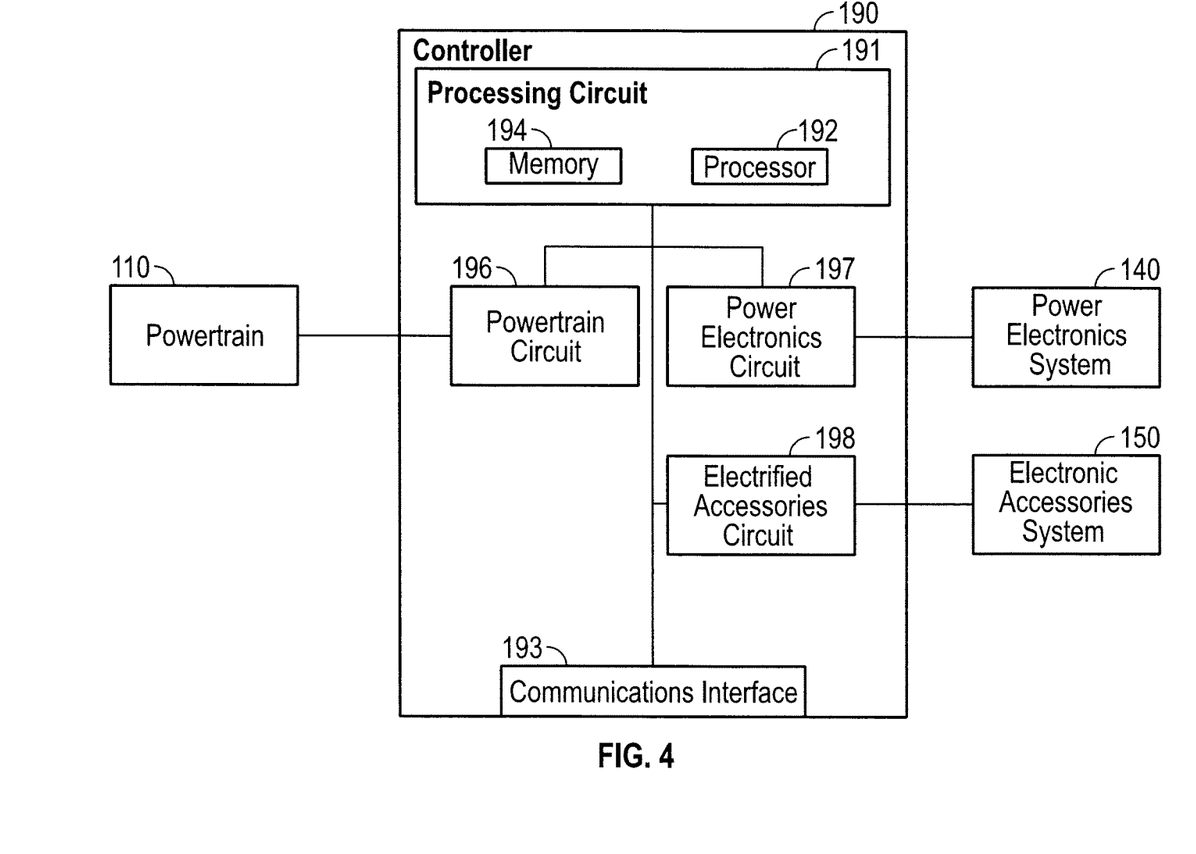
FIG. 4 is a schematic diagram of the controller of the vehicle of FIG. 1, according to an example embodiment.

Referring now to FIG. 4, a schematic diagram of the controller 190 of the vehicle 100 of FIG. 1 is shown according to an example embodiment. As shown in FIG. 4, the controller 190 includes a processing circuit 191 having a processor 192 and a memory 194, a powertrain circuit 196, a power electronics circuit 197, an electrified accessories circuit 198, and a communications interface 193. As described herein, the controller 190 is structured to control each of the first electrically-powered accessories 160, each of the second electrically-powered accessories 170, and/or each of the third electrically-powered accessories 180 independently and independent of a speed of the engine 111.

In one configuration, the powertrain circuit 196, the power electronics circuit 197, and/or the electrified accessories circuit 198 are embodied as machine or computer-readable media that is executable by a processor, such as the processor 192. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the powertrain circuit 196, the power electronics circuit 197, and/or the electrified accessories circuit 198 are embodied as hardware units, such as electronic control units. As such, the powertrain circuit 196, the power electronics circuit 197, and/or the electrified accessories circuit 198 may be embodied as one or more circuitry components including, but not limited to, processing circuitry, network interfaces, peripheral devices, input devices, output devices, sensors, etc. In some embodiments, the powertrain circuit 196, the power electronics circuit 197, and/or the electrified accessories circuit 198 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the powertrain circuit 196, the power electronics circuit 197, and/or the electrified accessories circuit 198 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, the powertrain circuit 196, the power electronics circuit 197, and/or the electrified accessories circuit 198 may also include programmable hardware devices such as field programmable gate arrays, programmable array logic, programmable logic devices or the like. In this regard, the powertrain circuit 196, the power electronics circuit 197, and/or the electrified accessories circuit 198 may include one or more memory devices for storing instructions that are executable by the processor(s) of the powertrain circuit 196, the power electronics circuit 197, and/or the electrified accessories circuit 198. The one or more memory devices and processor(s) may have the same definition as provided below with respect to the memory 194 and the processor 192. Thus, in this hardware unit configuration, the powertrain circuit 196, the power electronics circuit 197, and/or the electrified accessories circuit 198 may be geographically dispersed throughout separate locations in the vehicle 100. Alternatively and as shown, the powertrain circuit 196, the power electronics circuit 197, and/or the electrified accessories circuit 198 may be embodied in or within a single unit/housing, which is shown as the controller 190.

In the example shown, the controller 190 includes the processing circuit 191 having the processor 192 and the memory 194. The processing circuit 191 may be structured or configured to execute or implement the instructions, commands, and/or control processes described herein with respect to the powertrain circuit 196, the power electronics circuit 197, and/or the electrified accessories circuit 198. Thus, the depicted configuration represents the aforementioned arrangement where the powertrain circuit 196, the power electronics circuit 197, and/or the electrified accessories circuit 198 are embodied as machine or computer-readable media. However, as mentioned above, this illustration is not meant to be limiting as the present disclosure contemplates other embodiments such as the aforementioned embodiment where the powertrain circuit 196, the power electronics circuit 197, and the electrified accessories circuit 198, or at least one circuit of the powertrain circuit 196, the power electronics circuit 197, and the electrified accessories circuit 198, are configured as a hardware unit. All such combinations and variations are intended to fall within the scope of the present disclosure.

The processor 192 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the powertrain circuit 196, the power electronics circuit 197, and/or the electrified accessories circuit 198 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 194 (e.g., RAM, ROM, Flash Memory, hard disk storage, etc.) may store data and/or computer code for facilitating the various processes described herein. The memory 194 may be communicably connected to the processor 192 to provide computer code or instructions to the processor 192 for executing the or at least some of the processes described herein. Moreover, the memory 194 may be or include tangible, non-transient volatile memory or non-volatile memory. Accordingly, the memory 194 may include database components, object code components, script components, or any other type of information structure for supporting the various activities and information structures described herein.

The communications interface 193 may include wired or wireless interfaces (e.g., jacks, antennas, transmitters, receivers, transceivers, wire terminals, etc.) for conducting data communications with various systems, devices, or networks. For example, the communications interface 193 may include an Ethernet card and port for sending and receiving data via an Ethernet-based communications network and/or a Wi-Fi transceiver for communicating via a wireless communications network. The communications interface 193 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 193 of the controller 190 may facilitate communication between and among the controller 190 and one or more components of the vehicle 100 (e.g., components of the powertrain system 110, components of the power electronics system 140, components of the electrified accessories system 150, etc.). Communication between and among the controller 190 and the components of the vehicle 100 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The powertrain circuit 196 may be structured to control operation of and/or receive data regarding the operation of the engine 111, the electromagnetic device 130, and/or other components of the powertrain system 110. In some embodiments, the powertrain circuit 196 may include or be communicably and operatively coupled to the engine 111 and/or the electromagnetic device 130 to facilitate controlling operation of the engine 111 and/or the electromagnetic device 130. By way of example, the powertrain circuit 196 may be structured to facilitate selectively controlling a torque output, a speed output, and/or a power output of the engine 111 to power the electromagnetic device 130 and/or drive the vehicle 100. By way of another example, the powertrain circuit 196 may be structured to facilitate controlling and/or calibrating a power output of the electromagnetic device 130 (e.g., the high voltage AC electrical power generated thereby, etc.). The powertrain circuit 196 may be additionally or alternatively structured to receive and/or monitor data indicative of characteristics of the high voltage AC electrical power (e.g., power, voltage, current, etc.) generated by the electromagnetic device 130.

The power electronics circuit 197 may be structured to control operation of and/or receive data regarding the operation of the AC-to-DC inverter 142, the high voltage junction box 144, the DC-to-AC inverter 146, and/or the DC-to-DC converter 148. In some embodiments, the power electronics circuit 197 may include or be communicably and operatively coupled to the AC-to-DC inverter 142, the high voltage junction box 144, the DC-to-AC inverter 146, and/or the DC-to-DC converter 148 to facilitate controlling operation of the AC-to-DC inverter 142, the high voltage junction box 144, the DC-to-AC inverter 146, and/or the DC-to-DC converter 148. By way of example, the power electronics circuit 197 may be structured to control the AC-to-DC inverter 142 to regulate the high voltage DC electrical power (e.g., that is changed from the high voltage AC electrical power, etc.). For example, the power electronics circuit 197 may be structured to buffer, reduce, and/or otherwise alter the high voltage AC electrical power received by the AC-to-DC inverter 142 from the electromagnetic device 130. By way of another example, the power electronics circuit 197 may be structured to control the high voltage junction box 144 to selectively regulate an amount of high voltage DC electrical power that is provided to each of the first electrical path 145, the second electrical path 147, and/or the third electrical path 149. By way of still another example, the power electronics circuit 197 may be structured to control the DC-to-AC inverter 146 to regulate an amount of variable AC electrical power that is provided to each of the second electrically-powered accessories 170. By way of yet another example, the power electronics circuit 197 may be structured to control the DC-to-DC converter 148 to control the voltage of the low voltage DC electrical power (e.g., to reduce the high voltage DC voltage to the desired low voltage for the third electrically-powered accessories 180, etc.).

The electrified accessories circuit 198 may be structured to control operation of and/or receive data regarding the operation of the low voltage junction box 152, the first electrically-powered accessories 160, the second electrically-powered accessories 170, and/or the third electrically-powered accessories 180. In some embodiments, the powertrain circuit 196 may include or be communicably and operatively coupled to the low voltage junction box 152, the first electrically-powered accessories 160, the second electrically-powered accessories 170, and/or the third electrically-powered accessories 180 to facilitate controlling operation of the low voltage junction box 152, the first electrically-powered accessories 160, the second electrically-powered accessories 170, and/or the third electrically-powered accessories 180. By way of another example, the electrified accessories circuit 198 may be structured to control the low voltage junction box 152 to selectively regulate an amount of low voltage DC electrical power that is provided to each of the third electrically-powered accessories 180.

By way of another example, the electrified accessories circuit 198 may be structured to control each of the first electrically-powered accessories 160, the second electrically-powered accessories 170, and the third electrically-powered accessories 180 independently and independent of a speed of the engine. Having independent control of each of the electrically-powered accessories may facilitate full variable speed control of each respective electrically-powered accessory of the electrified accessories system 150. For example, by providing the high voltage AC electrical power generated by the electromagnetic device 130 to each of the plurality of electrically-powered accessories on an individual electrical power type (e.g., DC, AC, etc.) and voltage level basis (e.g., high, low, variable, etc.) specific to each respective electrically-powered accessory, and based on an electric power consumption need of each respective electrically-powered accessory, the electrified accessories circuit 198 may thereby be structured to control (e.g., the speed of, the output of, etc.) each and every one of the plurality of electrically-powered individually according to their optimum operating conditions to meet the current demand required from the individual accessory. Such ability to control each electrically-powered accessory individually may allow for more efficient and optimum operation of each electrically-powered accessory, as well as provide the ability to properly size the electrically-powered accessory for a desired application.

The controller 190 may be further structured to maximize or substantially maximize energy capture during braking events of the vehicle 100 using unconventional methods (e.g., since the vehicle 100 does not include a high voltage energy storage device, using a regenerative braking systems, etc.). By way of example, the controller 190 may be structured to control operation of one or more of the electrified accessories (e.g., the first electrically-powered accessories 160, the second electrically-powered accessories 170, the third electrically-powered accessories 180, etc.) using electrical power generated during such braking events (e.g., with power generated by a regenerative braking system, etc.). As an example, when "free energy" (i.e., energy that would otherwise be lost) is available (e.g., from regenerative braking during a braking event, etc.), the controller 190 may operate the electrified air compressor 172 for vehicle pneumatics to convert an electrical input (e.g., the free energy) into pneumatic energy stored in an air tank. Therefore, the controller 190 may increase compressor operation during a braking event to offset compressor operation in the future, through the use of increased stored compressed air. As another example, when the free energy is available, the controller 190 may operate an engine or motor cooling system (e.g., the electrified fan 184, a coolant pump, etc.) that regulates the thermal energy stored in the system (e.g., the engine 111, the electromagnetic device 130, etc.). Therefore, the controller 190 may increase a cooling operation during a braking event to be offset by lower cooling effort in the future so long as the system can tolerate the temporary decrease in thermal energy in the interim.

It should be understood that no claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIG. 4, it should be understood that the controller 190 may include any number of circuits for completing the functions described herein. For example, the activities and functionalities of the powertrain circuit 196, the power electronics circuit 197, and/or the electrified accessories circuit 198 may be combined in multiple circuits or as a single circuit. Additional circuits with additional functionality may also be included. Further, it should be understood that the controller 190 may further control other activity beyond the scope of the present disclosure.

As mentioned above and in one configuration, the "circuits" may be implemented in machine-readable medium for execution by various types of processors, such as processor 192 of FIG. 4. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system for a non-hybrid/non-electric vehicle, comprising:
    a high voltage electromagnetic device structured to couple to an engine and generate AC electrical power from the engine; and
    a power electronics system electrically coupled to the high voltage electromagnetic device, the power electronics system including:
    an AC-to-DC inverter structured to receive and change the AC electrical power to regulated DC electrical power; and
    a junction box structured to receive and provide the regulated DC electrical power to a plurality of electrical paths that electrically couple the junction box to a plurality of electrically-powered accessories, wherein the plurality of electrical paths include:
    a first electrical path structured to facilitate providing the regulated DC electrical power directly to a first electrically-powered accessory;
    a second electrical path including a DC-to-AC inverter structured to facilitate providing the regulated DC electrical power to a second electrically-powered accessory as variable AC electrical power; and
    a third electrical path including a DC-to-DC converter structured to facilitate providing the regulated DC electrical power to a third electrically-powered accessory at a reduced voltage DC electrical power;
    wherein the regulated DC electrical power is provided to each of the plurality of electrically-powered accessories based on an electric power consumption need of each respective electrically-powered accessory.

2. The system of claim 1, wherein the system does not include a high voltage energy storage device.

3. The system of claim 1, wherein the engine is an internal combustion engine.

4. The system of claim 1, wherein the high voltage electromagnetic device is capable of generating the AC electrical power at a power output between 10 kilowatts and 50 kilowatts.

5. The system of claim 1, wherein the AC-to-DC inverter is structured to change the AC electrical power to the regulated DC electrical power having a voltage between 28 volts DC and 1,000 volts DC.

6. The system of claim 1, wherein the high voltage electromagnetic device is structured to operate at a peak torque between 150 Newton-meters and 250 Newton-meters.

7. The system of claim 1, wherein the reduced voltage DC electrical power has a voltage less than or equal to 28 volts DC.

8. The system of claim 1, further comprising a drive mechanism structured to couple the high voltage electromagnetic device to the engine, the drive mechanism including at least one of a gearing system and a pulley system structured to transfer a mechanical output from the engine into a mechanical input received by the high voltage electromagnetic device.

9. The system of claim 1, further comprising a controller structured to control each of the plurality of electrically-powered accessories independently and independent of a speed of the engine.

10. A method, comprising:
providing a motor-generator structured to couple to a non-hybrid engine system having an engine and generate electrical power from a mechanical input received from the engine;
providing a power electronics system structured to electrically couple the motor-generator to a plurality of electrically-powered accessories via a plurality of electric paths and regulate the electrical power to accessory specific output power for each of the plurality of electrically-powered accessories, wherein the plurality of electrical paths include:
  a first electrical path structured to facilitate providing regulated DC electrical power directly to a first electrically-powered accessory;
  a second electrical path including a DC-to-AC inverter structured to facilitate providing the regulated DC electrical power to a second electrically-powered accessory as variable AC electrical power; and
  a third electrical path including a DC-to-DC converter structured to facilitate providing the regulated DC electrical power to a third electrically-powered accessory at a reduced voltage DC electrical power; and
providing a controller structured to control each of the plurality of electrically-powered accessories independently and independent of a speed of the engine.

11. The method of claim 10, wherein the non-hybrid engine system does not include a high voltage energy storage device.

12. The method of claim 10, wherein the motor-generator is capable of generating the electrical power at a power output of at least 10 kilowatts.

13. The method of claim 10, further comprising providing a drive mechanism structured to couple the motor-generator to the engine, the drive mechanism including at least one of a gearing system and a pulley system structured to transfer a mechanical output from the engine into the mechanical input received by the motor-generator.

14. The method of claim 10, wherein the electrical power is high voltage AC electrical power, and wherein the power electronics system is structured to regulate the high voltage AC electrical power to at least one of high voltage DC electrical power, variable AC electrical power, and low voltage DC electrical power for each of the plurality of electrically-powered accessories.

15. A vehicle, comprising:
a motor-generator structured to couple to an engine and generate high voltage AC electrical power from a mechanical input received from the engine; and
a power electronics system electrically coupled to the motor-generator and a plurality of electrically-powered accessories via a plurality of electrical paths, the power electronics system structured to regulate the high voltage AC electrical power to accessory specific output power for each of the plurality of electrically-powered accessories, the accessory specific output power including at least one of high voltage DC electrical power, variable AC electrical power, and low voltage DC electrical power, wherein the plurality of electrical paths include:
  a first electrical path structured to facilitate providing regulated DC electrical power directly to a first electrically-powered accessory;
  a second electrical path including a DC-to-AC inverter structured to facilitate providing the regulated DC electrical power to a second electrically-powered accessory as the variable AC electrical power; and
  a third electrical path including a DC-to-DC converter structured to facilitate providing the regulated DC electrical power to a third electrically-powered accessory at the low voltage DC electrical power.

16. The vehicle of claim 15, further comprising a controller structured to control each of the plurality of electrically-powered accessories independently and independent of a speed of the engine.

17. The vehicle of claim 15, wherein the vehicle only includes a low voltage energy storage device structured as a lead acid battery.

18. The vehicle of claim 15, wherein the motor-generator is capable of generating the high voltage AC electrical power at a power output of at least 10 kilowatts.

19. The vehicle of claim 15, wherein the motor-generator is structured to generate the high voltage AC electrical power having a voltage between 28 volts AC and 1,000 volts AC.

* * * * *